United States Patent [19]

Deutsch

[11] Patent Number: 5,154,278
[45] Date of Patent: Oct. 13, 1992

[54] APPARATUS FOR TRANSFERRING ARRAYS OF ROD-SHAPED ARTICLES OF THE TOBACCO PROCESSING INDUSTRY

[75] Inventor: Reinhard Deutsch, Geesthacht, Fed. Rep. of Germany

[73] Assignee: Körber AG, Hamburg, Fed. Rep. of Germany

[21] Appl. No.: 682,736

[22] Filed: Apr. 9, 1991

[30] Foreign Application Priority Data

Apr. 14, 1990 [DE] Fed. Rep. of Germany ....... 4012114

[51] Int. Cl.⁵ ............................................. B65G 47/34
[52] U.S. Cl. .............................. 198/475.1; 198/476.1; 198/478.1; 198/482.1
[58] Field of Search ............... 198/475.1, 476.1, 477.1, 198/482.1, 478.1

[56] References Cited

U.S. PATENT DOCUMENTS

| | | | |
|---|---|---|---|
| 3,517,477 | 6/1970 | Thornton | 198/475.1 X |
| 3,992,855 | 11/1976 | Palmieri et al. | 198/475.1 X |
| 4,362,235 | 12/1982 | Erdmann . | |
| 4,471,866 | 9/1984 | Erdmann . | |
| 4,503,967 | 3/1985 | Erdmann . | |
| 4,511,027 | 4/1985 | Zamboni | 198/476.1 X |
| 4,823,536 | 4/1989 | Manservigi et al. | 198/476.1 X |
| 4,866,912 | 9/1989 | Deutsch . | |
| 4,889,226 | 12/1989 | Deutsch . | |

Primary Examiner—D. Glenn Dayoan
Attorney, Agent, or Firm—Peter K. Kontler

[57] ABSTRACT

Apparatus for transferring block-shaped arrays of plain or filter cigarettes in a packing machine has a rotary first conveyor which orbits a set of equidistant pockets for discrete arrays about a first vertical axis. The first conveyor is provided with drives which can pivot the pockets about discrete second vertical axes as well as impart to the pockets translatory movements radially of the first conveyor as well as radially of two turret-shaped second conveyors. One second conveyor delivers arrays to the pockets of the first conveyor, and the other second conveyor receives arrays from the pockets of the first conveyor. The ability of pockets on the first conveyor to perform superimposed pivotal as well as dual translatory movements enables such pockets to advance in close proximity to an in exact alignment with the pockets of the one second conveyor along a relatively long first portion of their endless path about the first axis as well as to advance in close proximity to and in exact alignment with the pockets of the other second conveyor along a relatively long second portion of their endless path about the first axis.

10 Claims, 4 Drawing Sheets

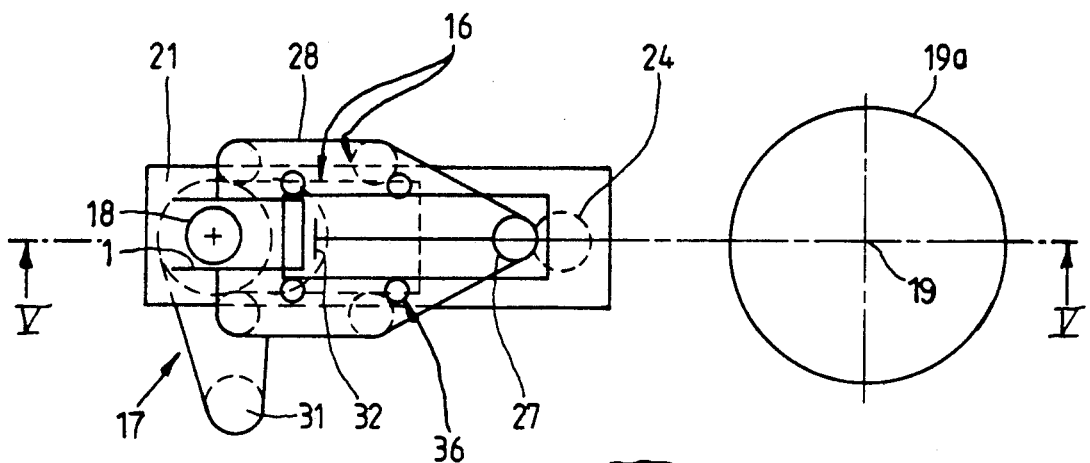
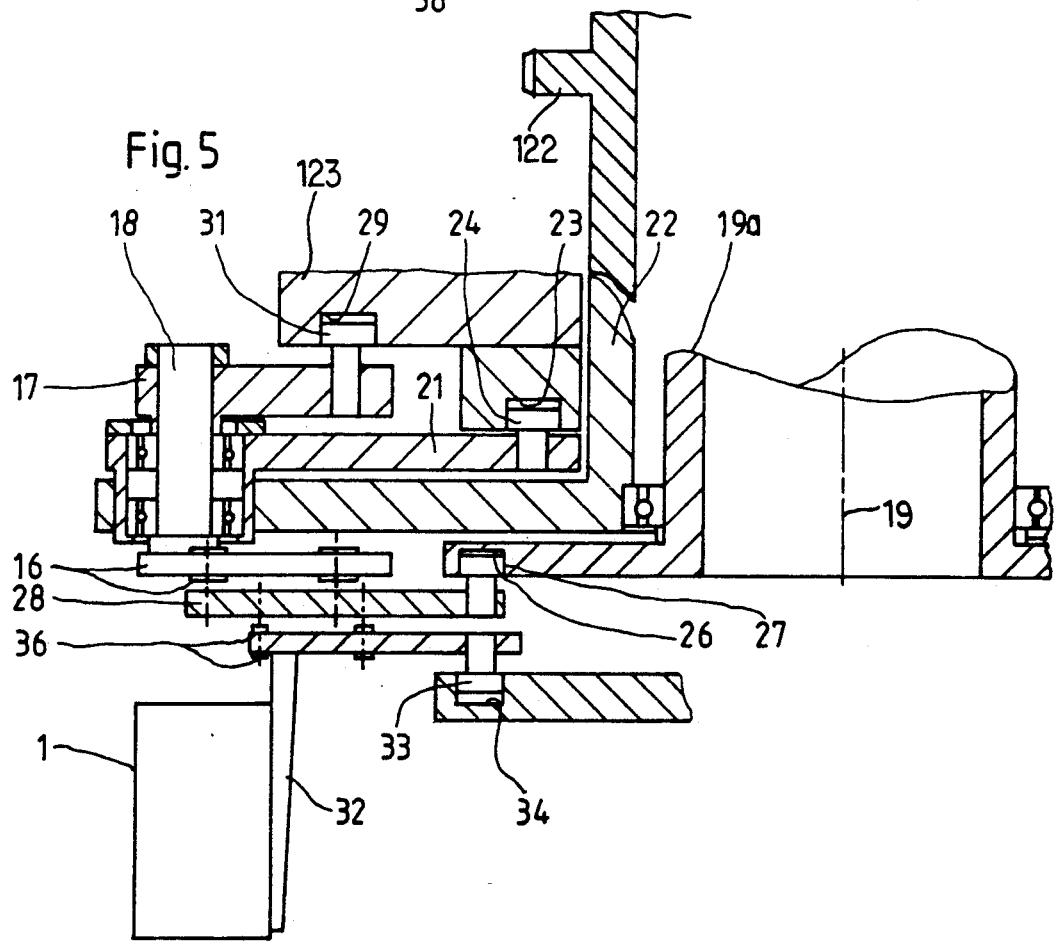

APPARATUS FOR TRANSFERRING ARRAYS OF ROD-SHAPED ARTICLES OF THE TOBACCO PROCESSING INDUSTRY

BACKGROUND OF THE INVENTION

The invention relates to improvements in apparatus for transporting cigarettes or other rod-shaped articles of the tobacco processing industry. More particularly, the invention relates to improvements in apparatus for transferring arrays of rod-shaped articles of the tobacco processing industry with two or more conveyors. Still more particularly, the invention relates to improvements in apparatus for transferring substantially block-shaped arrays of rod-shaped articles of the tobacco processing industry with two or more conveyors in cigarette packing or analogous machines.

It is already known to manipulate arrays of rod-shaped articles (such as plain or filter cigarettes) in a packing machine while the arrays are in continuous motion, or while the arrays are intermittently advanced, in the pockets of endless conveyors. For example, one of the conveyors can serve to deliver arrays from an arraying station formations (e.g., formations containing five, ten or twenty articles). Block forming stations are described and shown, for example, in commonly owned Erdmann U.S. Pat. No. 4,362,235 and Erdmann et al. U.S. Pat. Nos. 4,471,866 and 4,503,967 to which reference may be had, if necessary. A second conveyor which receives the arrays or formations from the one conveyor can cooperate with the one conveyor to complete one or more wrapping or packing operations. Additional wrapping operations can be carried out while the arrays advance with the second conveyor, during transfer of partly wrapped arrays onto a third conveyor and/or during advancement of arrays in the pockets of the third conveyor. Reference may be had to commonly owned Deutsch U.S. Pat. Nos. 4,866,910 and 4,889,226 and to commonly owned Bamrungbhuet et al. U.S. Pat. No. 4,999,970.

A drawback of certain presently known apparatus is that the arrays of rod-shaped articles are not invariably in an optimum orientation for transfer from conveyor to conveyor or for the application of one or more blanks of wrapping material thereto. Moreover, it is desirable to further increase the rate of transport of arrays in certain presently known mass-producing or mass-processing machines, e.g., in cigarette packing machines. Still further, presently known apparatus cannot ensure a longer-lasting alignment of pockets for formations of rod-shaped articles on two neighboring conveyors even though longer-lasting alignment would be desirable and beneficial for the making of cigarette packs with a higher degree of reliability and reproducibility.

OBJECTS OF THE INVENTION

An object of the invention is to provide an apparatus which can transfer arrayed rod-shaped articles in a highly predictable manner, without damaging the articles, without disturbing the arrays and at a high frequency.

Another object of the invention is to provide the apparatus with novel and improved means for orienting the receptacles (e.g., in the form of pockets) for arrays of rod-shaped articles of the tobacco processing industry preparatory to and during transport of arrays.

A further object of the invention is to provide the apparatus with novel and improved means for superimposing several different movements upon the receptacles for arrays of rod-shaped articles.

An additional object of the invention is to provide the apparatus with novel and improved means for establishing long paths for advancement of independently movable receptacles for arrays of rod-shaped articles in optimum positions relative to each other for the transfer of arrays between them.

Still another object of the invention is to provide a novel and improved method of manipulating receptacles for arrays of rod-shaped articles while the receptacles are caused to circulate along an endless path.

A further object of the invention is to provide an apparatus wherein a first movement of a set of receptacles for arrays of rod-shaped articles initiates and sustains several additional movements of such receptacles.

SUMMARY OF THE INVENTION

The invention is embodied in an apparatus for transferring arrays of rod-shaped articles of the tobacco processing industry, for example, for transferring block-shaped arrays of parallel plain or filter cigarettes or other smokers' products in a packing machine. The improved apparatus comprises a first transporting unit including a first conveyor having a plurality of first receptacles (e.g., in the form of pockets each of which can snugly receive an array) for discrete arrays of rod-shaped articles, means for moving the receptacles along an endless path about a first axis, a first drive having means for imparting to the first receptacles in the endless path a pivotal movement about discrete second axes, and a second drive having means for imparting to the first receptacles in the endless path at least one translatory movement. The apparatus further comprises a second transporting unit including at least one second conveyor having a plurality of second receptacles (such second receptacles can be similar to or identical with the first receptacles) for discrete arrays of rod-shaped articles and means for advancing the second receptacles along a second endless path about a third axis which is at least substantially parallel with the first axis. The first and second paths include elongated portions which are complementary to and adjacent each other and wherein each second receptacle is aligned with and adjacent a first receptacle.

The second transporting unit can comprise an additional second conveyor having a plurality of third receptacles for discrete arrays of rod-shaped articles and means for advancing the third receptacles along a third endless path about a fourth axis which is at least substantially parallel to the first axis. The first and third paths include elongated portions which are complementary to and adjacent each other and wherein each third receptacle is aligned with and adjacent a first receptacle.

The second axes are or can be at least substantially parallel to the first axis.

The second drive means preferably comprises means for imparting to the first receptacles a plurality of translatory movements, and at least one of such plurality of translatory movements is superimposed upon the pivotal movement of the respective first receptacle. The means for imparting to the first receptacles a plurality of translatory movements can include means for confining the first receptacles to translatory movement substantially radially of the first axis [in one more predetermined portions of the first path) and/or means for confining the first receptacles to translatory movement substantially radially of the third axis during movement of the first receptacles along the elongated portion of the first path.

The means for imparting the pivotal and translatory movements preferably include elements (such as roller followers) which derive motion from the moving means of the first transporting unit to impart to the first receptacles pivotal and translatory movements in response to movement of the first receptacles along the first path.

For example, the means for imparting pivotal movements can include a stationary cam (e.g., an endless groove cam), levers which are pivotable about the second axes and support the respective first receptacles, and followers provided on or otherwise associated with the levers and/or with the first receptacles and tracking the cam to pivot the levers about the respective second axes in response to movement of the first receptacles along the first path.

The means for imparting translatory movements can include at least one stationary cam (e.g., an endless groove cam), a support for each first receptacle (such supports can be mounted on the respective levers or vice versa), and a follower provided on each support and tracking the cam to impart to the respective first receptacle a translatory movement in response to movement of the first receptacles along the first path.

In accordance with a presently preferred embodiment, the first drive comprises a lever for each of the first receptacles, and each such lever is carried by the moving means of the first transporting unit and is pivotable about the respective second axis. The second drive of the first transporting unit can comprise a support for each lever and cam-and-follower means for moving the supports substantially radially of the first axis during one or more predetermined stages of movement of the first receptacles along the first path.

The apparatus preferably further comprises means for expelling arrays of rod-shaped articles from the first receptacles into the adjacent second or third receptacles during advancement of such receptacles along the elongated portions of their respective paths. The expelling means can comprise a discrete pusher for each first receptacle and cam-and-follower means for moving the pushers relative to the respective first receptacles in response to movement of first receptacles along the first path, and more specifically during movement of first receptacles along one or more selected portions of the first path.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain presently preferred specific embodiments with reference to the accompanying drawing.

BRIEF DESCRIPTION OF THE DRAWING

FIG. 4 is a plan view of the shaft for the moving means of the conveyor of the first transporting unit and a plan view of the drives for one of the receptacles on the conveyor of the first transporting unit; and FIG. 5 is an enlarged vertical sectional view as seen in the direction of arrows from the line V—V in FIG. 4.

DESCRIPTION OF PREFERRED EMBODIMENTS

Figure 1:
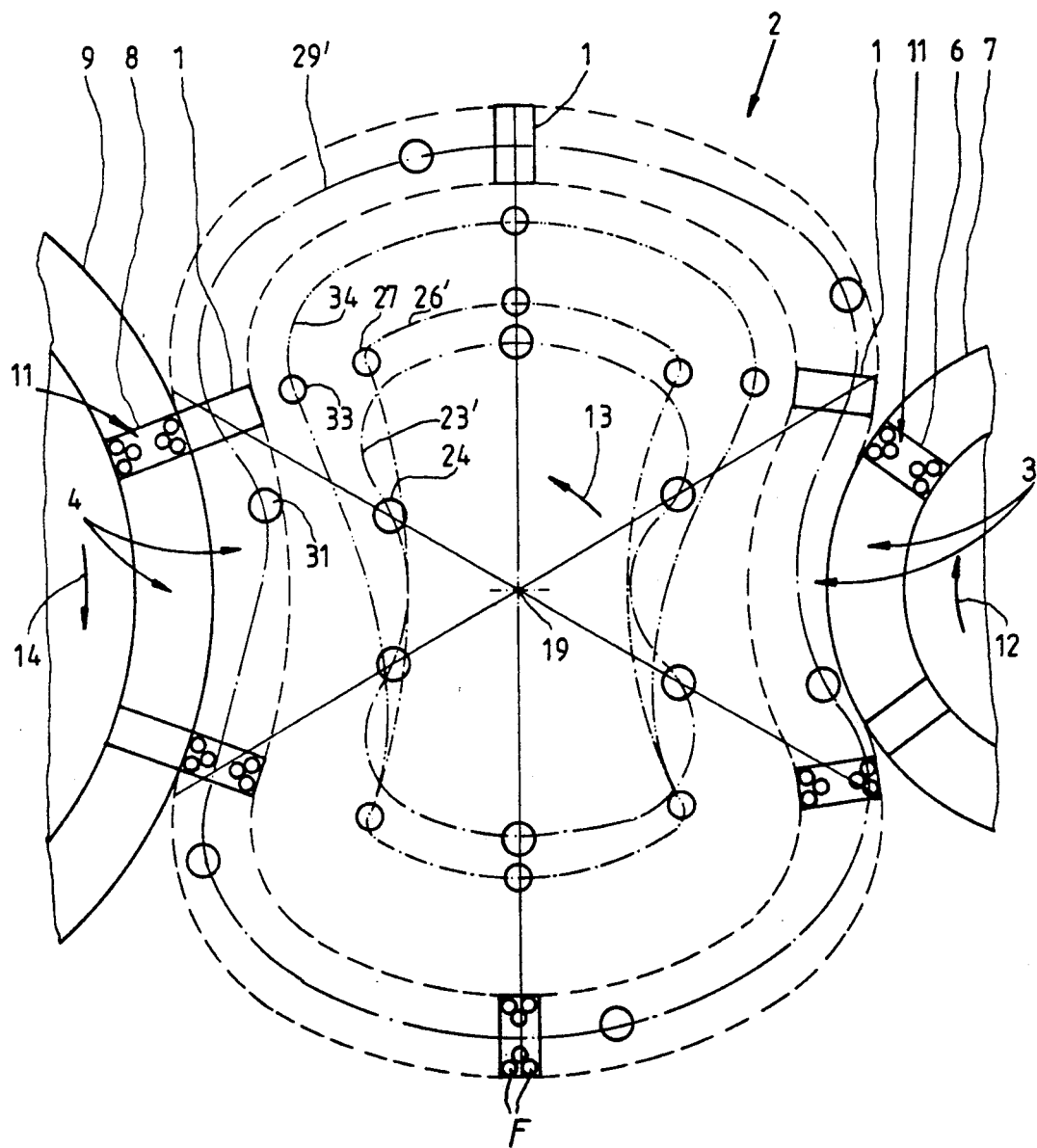
FIG. 1 is a fragmentary schematic plan view of an apparatus which embodies one form of the invention and wherein the conveyor of the first transporting unit carries six equidistant receptacles and causes such receptacles to advance along an endless path between two turret-shaped rotary conveyors forming part of the second transporting unit.

Referring to FIG. 1, there is shown an apparatus which comprises a first transporting unit including a first conveyor 2 with equidistant receptacles 1, and a second transporting unit including two second conveyors 7, 9 with second and third receptacles 6 and 8, respectively. The conveyor 2 defines for the receptacles 1 an endless (denoted by the phantom line 29') path and includes a moving means here shown as a disc 22 (FIG. 5) which is rotatable about a first vertical axis, namely about the axis 19 of an upright shaft 19a which can be seen in FIGS. 4 and 5. The disc 22 is driven relative to the shaft 19a by a system of gears (one shown in 5, as at 122) or in any other suitable way. The second conveyor 7 is a turret which is driven by gears or in another way to rotate about a vertical axis (i.e., about an axis which is parallel to the axis 19) and to thereby advance its equidistant receptacles 6 along a second endless path having an elongated portion (e.g., a portion extending along an arc of approximately 90°) which is adjacent and complementary to an elongated portion 3 of the endless path 29' for the receptacles 1. The additional second conveyor 9 is rotatable (by gears or otherwise) about a vertical axis (i.e., about an axis which is parallel to the axis 19) and moves its equidistant receptacles 8 along an endless third path having an elongated portion which is adjacent and complementary to an elongated portion 4 of the path 29' for the receptacles 1. The arrows 12, 13 and 14 respectively indicate the directions of movement of the receptacles 6, 1 and 8.

Each receptacle is designed to accommodate a substantially block-shaped array 11 of rod-shaped articles of the tobacco processing industry, e.g., an array of twenty parallel plain or filter cigarettes F in the customary formation with two outer layers of seven cigarettes each and a median layer of six cigarettes. However, it is equally within the purview of the invention to design the receptacles 6, 1 and 8 for the transport of arrays each of which comprises four, five, ten, twentyone or any other appropriate number of rod-shaped articles.

The conveyors 2, 7 and 9 are continuously driven and rotate at such a speed that a receptacle 6 which advances along the path portion 3 is adjacent to and is aligned with a receptacle 1, and that each receptacle 1 advancing along the path portion 4 is adjacent to and is aligned with a receptacle 8. This ensures that the arrays 11 which are confined in the receptacles 6 can be transferred into the aligned receptacles 1 and that the arrays 11 which are confined in the receptacles 1 can be transferred into the adjacent receptacles 8. The turret-shaped conveyor 7 can replace the conveyor 4, the turret-shaped conveyor 9 can replace the conveyor 6, and the conveyor 2 can replace the conveyor 3 in FIG. 1 of the aforementioned U.S. Pat. No. 4,866,912. The receptacles 6 of the conveyor 7 can receive arrays 11 (either directly or indirectly) from apparatus of the type described and shown in the aforementioned U.S. Pat. Nos. 4,362,235, 4,471,866 or 4,503,967.

As described and shown in U.S. Pat. No. 4,866,912, the arrays 11 can be draped in part (or entirely) while in the receptacles 6, in part (or entirely) while in the receptacles 1 and/or in part (or entirely) while in the receptacles 8. Certain packing operations can be performed while the arrays 11 are being transferred from the receptacles 6 into the receptacles 1 and/or from the receptacles 1 into the receptacles 8. The resulting packets of rod-shaped smokers' products are ready to be admitted into a carton filling machine or into a cellophaning machine.

In order to ensure proper orientation of receptacles 1 during advancement along the path portions 3 and 4, the conveyor 2 of the first transporting unit further comprises means for imparting to the receptacles 1 pivotal movements about vertical axes of discrete pivot members 18 (see particularly FIG. 5) as well as at least one but preferably two translatory movements radially of the axis 19 and/or radially of the axis of rotation of the turret-shaped conveyor 7 or 9. This enables the receptacles 1 to move into and to remain in exact alignment with the adjacent receptacles 6 (i.e., in positions in which they extend exactly radially of the axis of the conveyor 7) during movement along the path portion 3 and to move into and to remain in exact alignment with the adjacent receptacles 8 (i.e., in positions in which they extend exactly radially of the axis of the conveyor 9) during movement along the path portion 4. At least one translatory movement of a receptacle 1 can be at least partially superimposed upon the pivotal movement of the respective receptacle 1.

Figure 2:
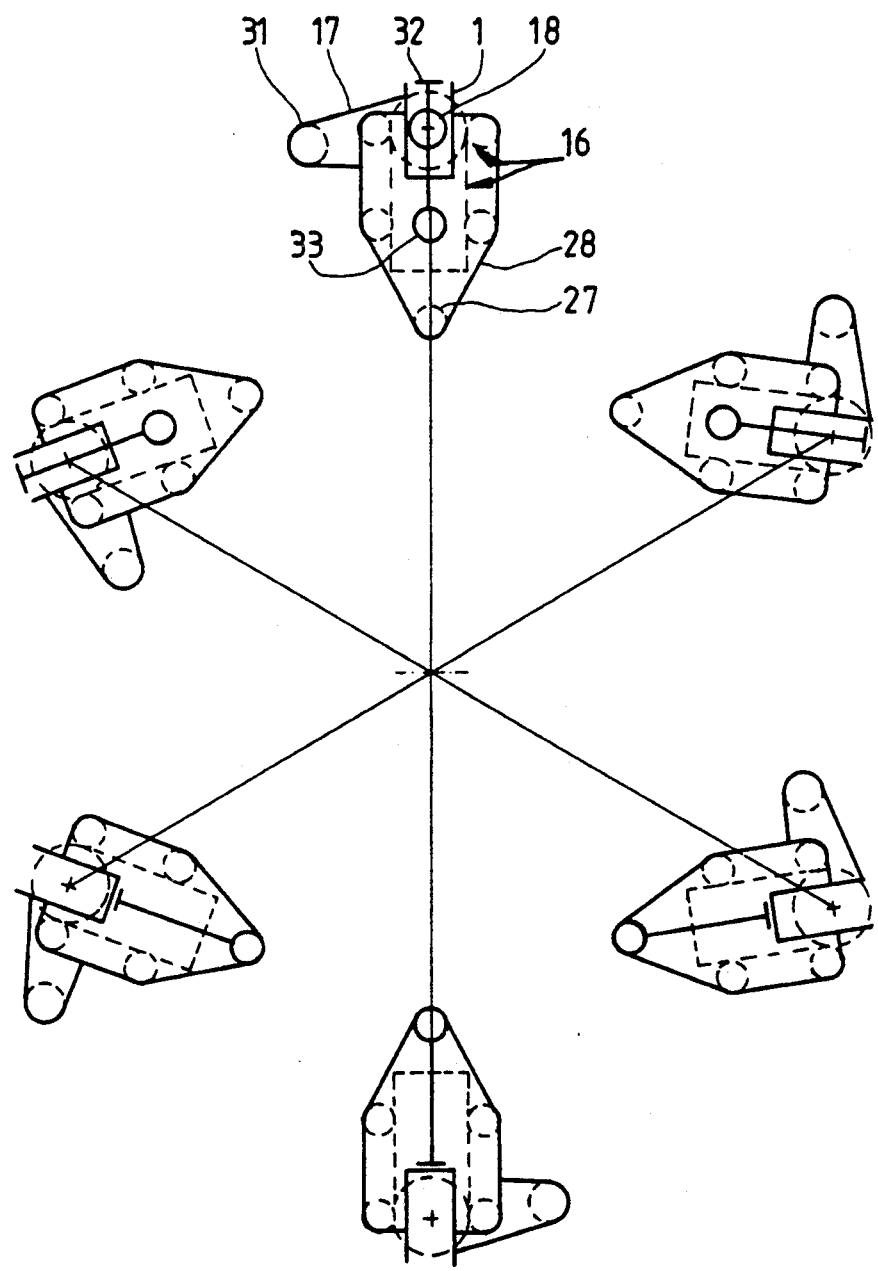
FIG. 2 is a plan view of the six receptacles on the conveyor of the first transporting unit, with each receptacle in a different orientation depending on its position relative to the conveyors of the second transporting unit.

The illustrated conveyor 2 carries six equidistant identical receptacles 1 which are disposed at the periphery of the disc 22. The pivot member 18 for each receptacle 1 carries a lever 17 (FIGS. 2, 4 and 5) which supports a straight guide 16 for the respective receptacle 1. The receptacles 1 are movable back and forth along the respective guides 16 and the respective levers 17 substantially or exactly radially of the axes of the corresponding pivot members 18. The guides 16 can constitute integral parts of the respective levers 17. The pivot members 18 are mounted on discrete supports in the form of pushers 21 which are mounted on the disc 22 and are movable radially of the axis 19 (see FIG. 3), i.e., radially of the shaft 19a which defines the axis 19. Thus, each receptacle 1 can perform a translatory movement (with the corresponding support 21, lever 17 and guide 16) in the radial direction of the axis 19, each receptacle 1 can perform a translatory movement along the respective guide 16, each receptacle 1 can be pivoted by the respective lever 17 about the axis of the corresponding pivot member 18, and each receptacle 1 is caused to circulate along the path 29' about the axis 19 by sharing the rotary movement of the disc 22 in the direction of arrow 13.

Figure 3:
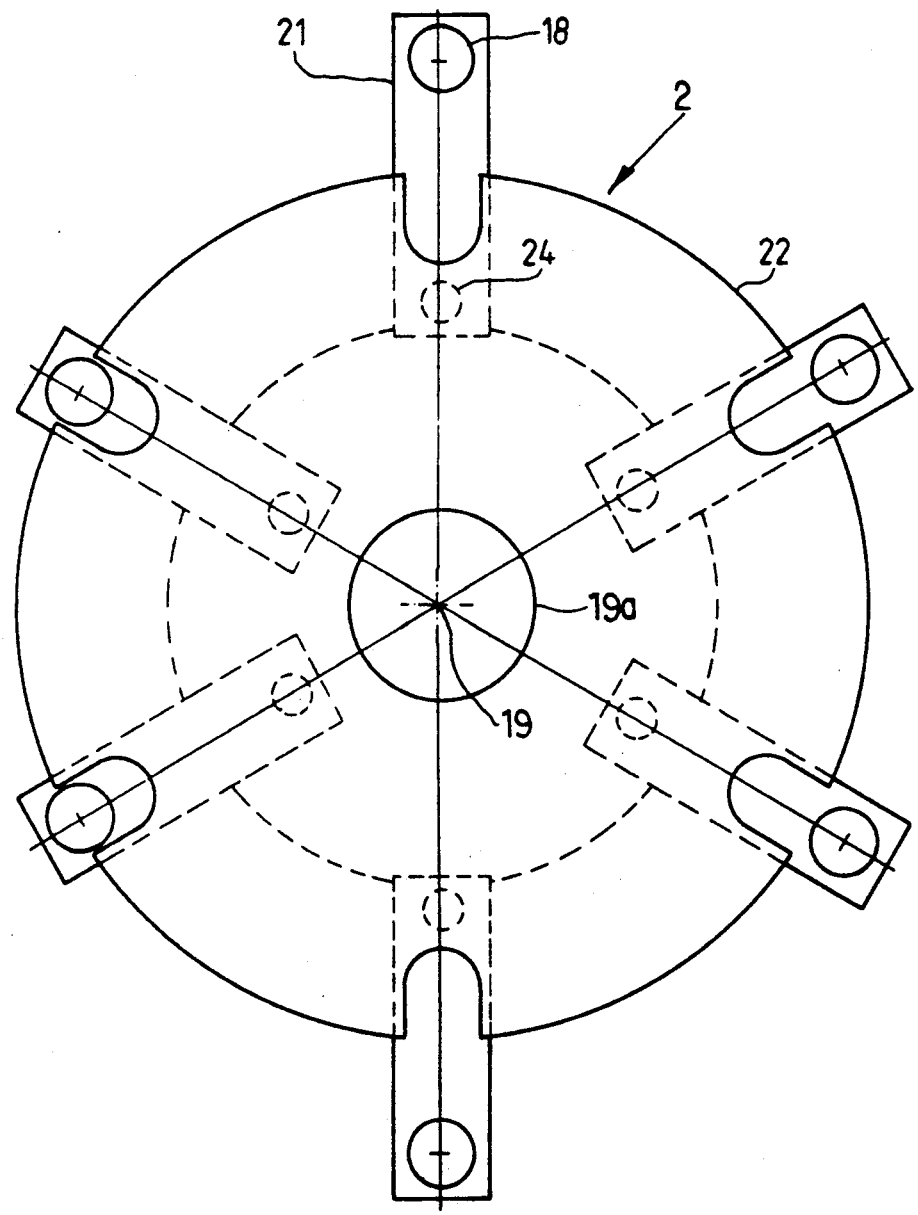
FIG. 3 is a plan view of the means for moving the receptacles on the conveyor of the first transporting unit and of certain elements of the drive which moves the receptacles radially of the axis of the conveyor of the first transporting unit.

The disc 22 supports six equidistant supports or pushers 21. Different radial positions of the supports 21 relative to the shaft 19a are shown in FIG. 3. The drive means for moving the supports 21 (and hence the respective receptacles 1) radially of the axis 19 derives motion from the disc 22 (i.e., such radial movements of each receptacle 1 take place in automatic response to rotation of the disc 22 about the axis 19) and includes a stationary endless groove cam 23 (see FIG. 5 which further shows a frame or housing 123 for the cam 23) and a roller follower 24 which tracks the cam 23 and is provided on the respective support 21. FIG. 1 merely shows a phantom line 23' denoting the path which is defined by the cam 23 for the roller followers 24 on the six equidistant supports 21.

The drive means for moving the receptacles 1 along the corresponding guides 16 substantially or exactly radially of the axes of the turret-shaped conveyors 7 and 9 (namely in order to align the receptacles 1 with the receptacles 6 in the path portion 3 and with the receptacles 8 in the path portion 4) comprises a second stationary endless groove cam 27 in a flange of the shaft 19a (FIG. 5) and roller followers 27 which extend into the groove of the cam 26 and are provided on plate-like holders 28, one for each receptacle 1 and each supporting one of the receptacles 1. The holders 28 form part of the guides 16. It goes without saying that the configuration of the groove in the cam 26 (in the regions of the path portions 3 and 4) is selected with a view to ensure movements of the receptacles 1 radially of the axes of the conveyors 7 and 9 (note the phantom line 26' which denotes in FIG. 1 the path of movement of roller followers 27 in the groove of the cam 26).

The means for pivoting the levers 17 about the axes of the respective pivot members 18 includes a further stationary groove cam 29 which is provided in the frame or housing 123 and receives roller followers 31. Each lever 17 has a first arm which carries the respective straight guide 16 and a second arm which carries the respective roller follower 31. The levers 17 perform pivotal movements which are superimposed upon translatory movements of the respective receptacles 1 along the straight guides 16 and/or under the action of the corresponding supports 21 in order to enable the receptacles 1 to assume optimum positions and optimum orientation relative to the receptacles 6 along the path portion 3 and relative to the receptacles 8 along the path portion 4.

The means for expelling arrays 11 from the receptacles 1 into the aligned receptacles 8 during advancement along the path portion 4 comprises pushers 32 or analogous expelling elements which are movable along straight guides 36 (FIG. 5) under the action of roller followers 33 extending into the endless groove of a stationary cam 34.

An important advantage of the improved apparatus is that the receptacles 1 of the conveyor 2 can perform a plurality of simultaneous and/or timely spaced apart movements relative to each other and relative to the disc 22 while orbiting about the axis 19 of the shaft 19a. This renders it possible to maintain each and every receptacle 1 in an optimum position relative to the adjacent receptacle 6 during advancement along the path portion 3, and relative to the adjacent receptacle 8 during advancement along the path portion 4. Furthermore, the path portions 3 and 4 are sufficiently long to permit a highly satisfactory transfer of arrays 11 from the receptacles 6 into the aligned receptacles 1 and from the receptacles 1 into the aligned receptacles 8. Still further, the path portions 3 and 4 are sufficiently long to ensure that one or more steps in connection with the wrapping of arrays 11 into blanks of paper, aluminum foil, plastic or cardboard can be carried out in an optimum way during advancement of arrays 11 along the path portion 3 and/or along the path portion 4.

Another important advantage of the improved apparatus is that the receptacles 1 are reliably supported and advanced while conforming their paths to the much simpler paths of the receptacles 6 (along the path portion 3) and to the much simpler paths of the receptacles 8 (along the path portion 4). Thus, each of the turret-shaped conveyors 7, 9 can advance its receptacles (6 and 8, respectively) along a single endless circular path with its center on the vertical axis of rotation of the respective turret-shaped conveyor.

As mentioned above, the improved apparatus can be used with considerable advantage in packing machines for cigarettes or other rod-shaped articles of the tobacco processing industry.

The apparatus of the present invention is susceptible of many modifications without departing from the spirit of the invention. For example, the drive means for imparting to the levers 17 pivotal movements about the axes of the respective pivot members 18, the drive means for imparting to the receptacles 1 a translatory movement radially of the axes of the conveyors 7 and 9, and the drive means for imparting to the receptacles 1 a translatory movement radially of the axis 19 can be equipped with discrete prime movers. However, the illustrated apparatus, wherein each of the three drives derives motion from the carrier 22 (i.e., from the means for moving the receptacles 1 along an endless path which extends around the axis 19) is preferred at this time because it is simpler, more compact and less expensive. In addition, it is rather simple and inexpensive to properly synchronize and superimpose the two translatory movements and the pivotal movement of each receptacle 1 during each and every orbit about the axis 19.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. Apparatus for transferring arrays of rod-shaped articles of the tobacco processing industry, comprising a first transporting unit including a first conveyor having a plurality of first receptacles for discrete arrays of rod-shaped articles, means for moving the first receptacles along a first endless path about a first axis, a first drive having means for imparting to the first receptacles in said first path a pivotal movement about discrete second axes which are at least substantially parallel to said first axis, and a second drive having means for imparting to first receptacles in said first path a plurality of translatory movements, at least one of said plurality of translatory movements being superimposed upon the pivotal movement of the respective first receptacle; and a second transporting unit including at least one second conveyor having a plurality of second receptacles for discrete arrays of rod-shaped articles and means for advancing said second receptacles along a second endless path about a third axis which is at least substantially parallel with said first axis, said paths including elongated portions which are complementary to and adjacent each other and wherein each second receptacle is aligned with and adjacent a first receptacle.

2. The apparatus of claim 1, wherein said second unit comprises an additional second conveyor having a plurality of third receptacles for discrete arrays of rod-shaped articles and means for advancing said third receptacles along a third endless path about a fourth axis which is at least substantially parallel to said first axis, said first and third paths including elongated portions which are complementary to and adjacent each other and wherein each third receptacle is aligned with and adjacent a first receptacle.

3. The apparatus of claim 1, wherein said means for imparting to said first receptacles a plurality of translatory movements includes means for confining said first receptacles to translatory movements substantially radially of said first axis.

4. The apparatus of claim 3, wherein said means for imparting to said first receptacles a plurality of translatory movements further comprises means for confining said first receptacles to translatory movements substantially radially of said third axis during movement of said first receptacles along said elongated portion of said first path.

5. The apparatus of claim 1, wherein said means for imparting said pivotal and translatory movements includes elements which derive motion from said moving means to impart to the first receptacles pivotal and translatory movements in response to movement of first receptacles along said first path.

6. The apparatus of claim 1, wherein said means for imparting translatory movements includes at least one stationary cam, a support for each first receptacle, and a follower provided on each support and tracking said cam to impart to the respective first receptacle a translatory movement in response to movement of first receptacles along said first path.

7. The apparatus of claim 1, further comprising means for expelling arrays of rod-shaped articles from said first receptacles into adjacent second receptacles during advancement of such receptacles along said elongated portions of their respective paths.

8. The apparatus of claim 7, wherein said expelling means comprises a discrete pusher for each of said first receptacles and cam-and-follower means for moving said pushers relative to the respective first receptacles in response to movement of said first receptacles along said first path.

9. Apparatus for transferring arrays of rod-shaped articles of the tobacco processing industry, comprising a first transporting unit including a first conveyor having a plurality of first receptacles for discrete arrays of rod-shaped articles, means for moving the first receptacles along a first endless path about a first axis, a first drive having means for imparting to the first receptacles in said first path a pivotal movement about discrete second axes, and a second drive having means for imparting to first receptacles in said first path at last one translatory movement, said means for imparting to the first receptacles a pivotal movement including a stationary cam, levers pivotable about said second axes and supporting the respective first receptacles, and followers provided on said levers and tracking said cam to pivot said levers about the respective second axes in response to movement of said first receptacles about said first axis; and a second transporting unit including at least one second conveyor having a plurality of second receptacles for discrete arrays of rod-shaped articles and means for advancing said second receptacles along a second endless path about a third axis which is at least substantially parallel with said first axis, said paths including elongated portions which are complementary to and adjacent each other and wherein each second receptacle is aligned with and adjacent a first receptacle.

10. Apparatus for transferring arrays of rod-shaped articles of the tobacco processing industry, comprising a first transporting unit including a first conveyor having a plurality of first receptacles for discrete arrays of rod-shaped articles, means for moving the first receptacles along a first endless path about a first axis, a first drive having means for imparting to the first receptacles in said first path a pivotal movement about discrete second axes, and a second drive having means for imparting to first receptacles in said path at least one translatory movement, said first drive comprising a lever for each of said first receptacles, each of said levers being carried by said moving means and being pivotable about the respective second axis, said second drive comprising a support for each of said levers and cam-and-follower means for moving said supports substantially radially of said first axis; and a second transporting unit including at least one second conveyor having a plurality of second receptacles for discrete arrays of rod-shaped articles and means for advancing said second receptacles along a second endless path about a third axis which is at least substantially parallel with said first axis, said paths including elongated portions which are complementary to and adjacent each other and wherein each second receptacle is aligned with and adjacent a first receptacle.

* * * * *